United States Patent
Hasanian et al.

(10) Patent No.: US 12,105,505 B2
(45) Date of Patent: Oct. 1, 2024

(54) ONLINE MONITORING OF ADDITIVE MANUFACTURING USING ACOUSTIC EMISSION METHODS

(71) Applicant: Mistras Group, Inc., Princeton, NJ (US)

(72) Inventors: Mostafa Hasanian, Princeton Junction, NJ (US); Hossain Saboonchi, Princeton Junction, NJ (US); Miguel A. Gonzalez-Nunez, Princeton Junction, NJ (US); Valery Godinez-Azcuaga, Princeton Junction, NJ (US)

(73) Assignee: Mistras Group, Inc., Princeton, NJ (US)

( * ) Notice: Subject to any disclaimer, the term of this patent is extended or adjusted under 35 U.S.C. 154(b) by 0 days.

(21) Appl. No.: 17/972,572

(22) Filed: Oct. 24, 2022

(65) Prior Publication Data
US 2023/0043416 A1 Feb. 9, 2023

Related U.S. Application Data

(62) Division of application No. 16/877,530, filed on May 19, 2020, now Pat. No. 11,493,906.

(51) Int. Cl.
*G05B 19/418* (2006.01)
*B29C 64/393* (2017.01)
(Continued)

(52) U.S. Cl.
CPC ...... *G05B 19/41875* (2013.01); *B29C 64/393* (2017.08); *B33Y 30/00* (2014.12);
(Continued)

(58) Field of Classification Search
None
See application file for complete search history.

(56) References Cited

U.S. PATENT DOCUMENTS 5,150,714 A * 9/1992 Green ................. G01S 7/52036
600/442
6,553,275 B1 * 4/2003 Mazumder ............ B33Y 50/02
700/121
(Continued)

FOREIGN PATENT DOCUMENTS

EP 3646968 A1 5/2020

OTHER PUBLICATIONS

Koester, L. W. et al., "In-situ acoustic signature monitoring in additive manufacturing processes," AIP Conference Proceedings, vol. 1949, No. 1, pp. 020006-1-8, Apr. 20, 2018.
(Continued)

*Primary Examiner* — Jason Lin
(74) *Attorney, Agent, or Firm* — Norton Rose Fulbright US LLP

(57) ABSTRACT

Embodiments provide systems and methods for utilizing acoustic sensors to detect defects via online or in situ monitoring of additive manufacturing (AM) processes. Sensors may capture acoustic waves associated with AM manufacturing operations. The acoustic emissions in combination with other sensing data, such as cameras or thermometers, may be used to characterize the state of the AM process, such as to detect a defect has occurred or confirm a defect has not occurred. When defects are detected, the AM process may be stopped to prevent further processing of a defective part. When defects are predicted as likely to occur, operational parameters of the AM device or process may be adjusted to mitigate the occurrence of a defect. The techniques disclosed herein enable detection of defects that occur underneath the surface of the part being manufactured, as well as correct issues with the AM device or process before a defect occurs.

20 Claims, 4 Drawing Sheets

(51) Int. Cl.
   *B33Y 30/00*    (2015.01)
   *B33Y 50/02*    (2015.01)
   *G01N 29/14*    (2006.01)
   *G01N 29/44*    (2006.01)

(52) U.S. Cl.
   CPC .............. *B33Y 50/02* (2014.12); *G01N 29/14* (2013.01); *G01N 29/4472* (2013.01); *G01N 2291/0289* (2013.01); *G05B 2219/32368* (2013.01); *G05B 2219/49023* (2013.01)

(56) References Cited

U.S. PATENT DOCUMENTS

| | | | |
|---|---|---|---|
| 7,242,988 B1 | 7/2007 | Hoffberg et al. | |
| 9,846,427 B2* | 12/2017 | Straub | G06T 7/194 |
| 9,918,811 B2* | 3/2018 | Beeby | B22F 10/66 |
| 9,999,924 B2* | 6/2018 | Dave | B33Y 50/02 |
| 10,500,675 B2* | 12/2019 | Cheverton | B22F 10/28 |
| 11,020,954 B2* | 6/2021 | Xu | B33Y 30/00 |
| 2005/0097961 A1 | 5/2005 | Yagi et al. | |
| 2012/0085172 A1 | 4/2012 | Wernitz | |
| 2015/0115490 A1* | 4/2015 | Reinarz | B29C 64/393 425/150 |
| 2016/0098825 A1* | 4/2016 | Dave | G06V 10/40 419/53 |
| 2017/0146488 A1* | 5/2017 | Gold | B29C 64/386 |
| 2017/0261438 A1 | 9/2017 | Okçuoglu et al. | |
| 2018/0101167 A1 | 4/2018 | DehghanNiri et al. | |
| 2018/0154484 A1 | 6/2018 | Hall | |
| 2018/0284758 A1 | 10/2018 | Cella et al. | |
| 2020/0096970 A1 | 3/2020 | Mehr et al. | |
| 2021/0016509 A1 | 1/2021 | Vora et al. | |

OTHER PUBLICATIONS

European Patent Office, Extended European Search Report issued for Application No. 21174660.7, dated Oct. 19, 2021, 10 pages.

* cited by examiner

ONLINE MONITORING OF ADDITIVE MANUFACTURING USING ACOUSTIC EMISSION METHODS

CROSS-REFERENCE TO RELATED APPLICATIONS

The present application is a division of U.S. patent application Ser. No. 16/877,530 filed May 19, 2020 and entitled "ONLINE MONITORING OF ADDITIVE MANUFACTURING USING ACOUSTIC EMISSION METHODS," issued Nov. 8, 2022 as U.S. Pat. No. 11,493,906, the disclosure of which is incorporated by reference herein in its entirety.

TECHNICAL FIELD

The present application is directed toward additive manufacturing processes and more specifically to techniques for using sensor-based feedback to control and improve additive manufacturing processes.

BACKGROUND

Additive Manufacturing (AM) processes, known as 3-dimensional (3D) printing, are widely used for various applications and purposes. For example, additive manufacturing processes are used to produce automobile parts and implants/models used by the medical industry, as well as making prototypes, and many other purposes and applications. Some of these parts and components may be very costly to manufacture and may take a significant amount of time to print (e.g., multiple days or even 1 week or longer). However, defects that occur during the additive manufacturing processes may result in losses in terms of both time (e.g., if the defects are not discovered until after significant time has been spent manufacturing the part) and costs (e.g., operating costs, material costs, and the like).

Additive manufacturing technologies are escalating drastically based on different techniques and printing strategies. The most common type AM method is extrusion-based 3D printing where a fiber (mostly polymers) is extruded through a nozzle and deposited layer by layer to build up the 3D model. The other well established method is powder-based 3D printing, during which powders are fused/sintered together selectively. Using the powder-based AM, the 3D printing of metals has been made possible. In this regard, the powders are either directly deposited on the surface or laid down in a layer, and a high energy beam (such as a laser or electron beam) illuminates the selected powders and increases the temperature up to the melting point. In another approach, welding of metal wires based on a defined pattern is the essence of wire-based AM.

Exemplary defects that may occur during additive manufacturing processes include delamination, voids, and blowouts, or lack of fusion in powder-based Additive Manufacturing. A delamination typically occurs when temperatures under which an additive manufacturing process is being performed experience a non-uniform temperature distribution or a rapid thermal gradient, creating thermal stresses. These thermal stresses may be accumulated in the parts which may cause the layers to be separated and form cracks (i.e., delaminations). Void-type defects are caused by a lack of extruded material during the printing process, which leaves a void in the part being manufactured. Some voids are an artifact of defects in the filament/wire/powder. On powder-based fusion techniques, voids can be made due to lack of fusion, laser malfunctioning, gas trap, or powder inconsistency. Blowout-type defects may occur if there is water, moisture, or other gases trapped in the filament/pallets, which causes a burst in the extruding material and forms a specific type of void in the materials.

While online or in situ techniques to detect such defects have been developed, existing approaches have proven to be unsatisfactory for various reasons. For example, one approach for online detection defects in additive manufacturing processes is visual inspection, where camera-based systems are utilized to capture image data during the additive manufacturing process and analyze the image data to identify defects or malfunctioning of the printing process. However, such techniques have proven unsatisfactory for detection of delaminations, which normally occur in the underlying layers and are not capable of being detected visually. Aside from this, visual inspection is incompetent to give information about integrity of the previous deposited layers or detecting areas with fusion deficiency. Another drawback of visual inspection techniques for monitoring 3D printed structures is computational cost and complexity. Monitoring an additive manufacturing process using imaging techniques requires use of high-speed ultra-super resolution cameras, resulting in significant amounts of data that must be processed and thus requires high amounts of computing resources. To mitigate such requirements, many camera-based approaches monitor only a small portion of the additive manufacturing process, such as a small area where material is being added, rather than the entire structure. However, due to the small size of the monitoring area, defects that occur elsewhere can be neglected. Additionally, for some printers, accessing and monitoring the area where the additive manufacturing process occurs is hardly possible (e.g., high temperature chambers limit or even prevent the use of cameras).

Other approaches that have been developed may use x-ray (CT scanning) or ultrasound technology to identify defects in 3D printed structures. While these techniques can identify defects that occur within the structure (e.g., internal defects that would not be visible using the camera imaging techniques described above) they are not capable of effectively detecting the occurrence of defects until after the additive manufacturing process has completed. Thus, although a defect internal to the structure may be identified, the detection of the defect does not occur until after the time and expense of manufacturing the structure has finished, resulting in excess waste (e.g., if the defect occurred early in the process). An additional disadvantage of x-ray and ultrasound imaging techniques is the time and cost of the defect detection process, which requires completed parts to be transported to a separate inspection station (or pause the additive manufacturing process for in situ monitoring) where the inspection can take place. These requirements increase the inspection costs and create delays in the detection process (i.e., such techniques are not suitable for online defect monitoring due to intrusive nature of the inspection).

SUMMARY

In the present disclosure, techniques for utilizing acoustic emissions to detect defects in an additive manufacturing process are described. In contrast to the techniques described above, embodiments of the present disclosure enable defects to be detected without requiring the use of cameras, which enables defects that may occur below the surface of a structure being produced via an additive manufacturing process to be detected. Further, the acoustic emission techniques disclosed herein enable defect detection and monitoring to be performed online or in situ, thereby overcoming the disadvantages of other types of techniques used for detected defects associated with an additive manufacturing process, such as ultrasound or x-ray analysis techniques.

In the disclosed systems and methods, sensors may be used to capture the emitted acoustic wave information associated with additive manufacturing operations. The collected acoustic wave information may be used to characterize the state of the additive manufacturing process, such as to determine that a defect has occurred or to confirm that printing is occurring in a normal fashion. When defects or anomalies are detected, the additive manufacturing process may be stopped to prevent further processing of a defective part. When defects are predicted as likely to occur, operational parameters of the additive manufacturing device or process may be adjusted to mitigate the occurrence of a defect. The techniques disclosed herein enable detection of defects that occur underneath the surface of the part being manufactured, as well as identify issues with the additive manufacturing device or process that may be corrected before a defect occurs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings and presentations, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, structures and components are shown in block diagram form for clarity of presentation.

Figure 1:
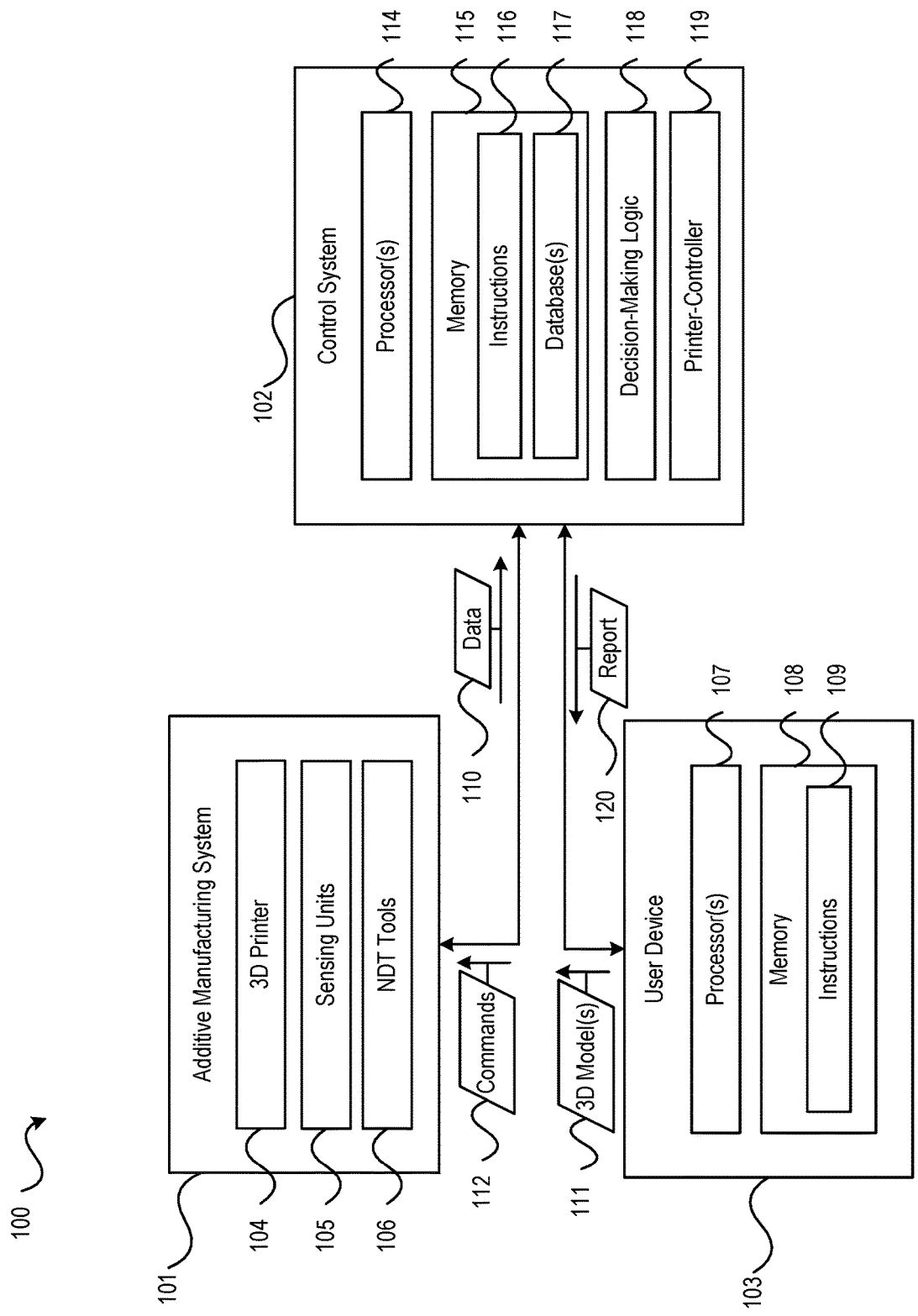
FIG. 1 is a block diagram of a system for controlling an additive manufacturing process based on in situ monitoring in accordance with embodiments of the present disclosure.

Referring to FIG. 1, a block diagram of a monitoring platform for controlling an additive manufacturing process based on in situ monitoring in accordance with embodiments of the present disclosure is shown as a monitoring platform 100. The monitoring platform 100 may be configured to monitor the additive manufacturing process to detect defects or faults that occur during the additive manufacturing process and use the information obtained during the monitoring to provide feedback and control of the additive manufacturing process, as described in more detail below. As shown in FIG. 1, the monitoring platform 100 includes an AM system 101, a control system 102, and a user device 103.

As shown in FIG. 1, the AM system 101 includes a 3D printer 104, sensing units 105, and one or more nondestructive testing (NDT) tools 106. The 3D printer 104 may be a fiber-based printer that extrudes the fiber (mostly polymers) through a nozzle to build up the 3D model, or a powder-based printer 104 may be configured to print 3D structures or objects based on 3D models and print-commands. The sensing units 105 may include one or more sensors configured to monitor operations of the AM system 101, such as to monitor a print job for a defect or printing anomaly. The one or more sensors may include acoustic sensors, thermometers, visual and infrared cameras, humidity sensors, or other types of sensors configured to facilitate operations in accordance with embodiments of the present disclosure. The NDT tools 106 may include a laser-ultrasonic tool, a laser profilometer, or other types of tools configured to facilitate inspection of a component undergoing an AM process.

The control system 102 may include one or more processors 114, a memory 115, decision-making logic 118, and a printer-controller 119. The one or more processors 114 may include one or more microcontrollers, application specific integrated circuits (ASICs), field programmable gate arrays (FPGAs), central processing units (CPUs) having one or more processing cores, or other circuitry and logic configured to facilitate the operations of the monitoring platform 100 in accordance with aspects of the present disclosure. The memory 115 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. As shown in FIG. 1, the memory 115 may store instructions 116. The instructions 116 may be executable by the one or more processors 114 to perform operations of the control system 102, such as to control and monitor an AM process performed by the control system 102 based on the model 111 received from the user device 103, as described in more detail below. Additionally, the memory 115 may store information, such as the data 110 received from the AM system 101 and the 3D models 111 received from the user device 103 at one or more databases 117.

The decision-making logic 118 may be responsible for both data processing and then issuing certain reports/commands to different portions of the platform 100. The decision-making logic 118 may be configured to analyze data (e.g., the data 110 received from the AM system 101) and detect defects and anomalies that occur during an AM process. Additionally, the decision-making logic 118 may be configured to manage the AM process based on the analysis of the data 110 and any detected defects or anomalies that may occur, such as to cancel the AM process (e.g., to avoid furthering the AM process when a defect has occurred or to halt the AM process to prevent an anomaly or defect from occurring). Additional aspects of the operations of the decision-making logic 118 are described in more detail below. The printer-controller 119 may be configured to generate commands (e.g., based on a 3D model) for controlling the 3D printer 104 of the AM system 101, which are shown in FIG. 1 as commands 112. In an aspect, the functionality provided by the decision-making logic 118 and the printer-controller 119 may be stored as the instructions 116. In an aspect, the control system 102 may be an edge system or device, a cloud-based system or device, or a combination of edge and cloud-based systems and devices. The control system 102 may be a computing device, such as a desktop computing device or a laptop computing device that is local or situated on the Internet (e.g., edge versus cloud computing). In edge computing data is processed locally or close to the end user, while in cloud computing datacenters having computing resources available to many users are accessible over the internet. In some aspects, a combination of edge and cloud computing devices providing different functionality may be utilized. As an example, a first portion of the commands and data processing may be performed by an edge computing device, while other commands and data processing operations are performed by a cloud computing device. Advanced signal processing and artificial intelligence data analysis may be used to update analyze acoustic emissions according to embodiments of the present disclosure. In an aspect, portions of the functionality provided by the control system 102 may be provided via computing resources in the cloud, such as the advanced signal processing and artificial intelligence data analysis. Such an implementation may enable more efficient utilization of computing resources as compared to performing such functionality at a local computing device (e.g., an edge device) because cloud resources may be ramped up for processing and then taken offline when not in use instead of requiring the local device to have sufficient computing resources to perform such tasks and then having excess or wasted computing resources sitting idle when such tasks are not being performed.

In aspects, the decision-making logic 118 may be configured to perform data processing operations and data fusion operations to process data obtained during monitoring of an AM process, which may be a production run of the AM process to manufacture components or a test run of the AM process to develop a library of information that may be used to detect defects and anomalies occurring in the AM process. Data processing operations may include analysis of a single type of data, that is acoustic waveforms received from sensors of the AM system 101. Data fusion operations may involve analysis of multiple types of sensor data in a synchronized manner. For example, sensor data received from the plurality of sensors 105 may be timestamped to enable the sensor data to be aligned in time, which may enable the sensor data to be associated with different aspects of the AM process. Additionally, spatial information associating each of the plurality of sensors with a particular location in space, such as information indicating how each of the plurality of sensors are positioned related to each other and the AM system 101, may be stored in the memory 115, such as a spatial data database of the one or more databases 117. The data fusion processing may provide unique applications to the concepts described herein. A data fusion process may be fed data 110 from the sensing units 105 of the AM system 101, such as data from an infrared camera, thermometer sensors disposed in the ambient air of the environment where the AM process is taking place, the printing rate/speed, and a plurality of AE sensors for monitoring and controlling energy density of beams (e.g., laser beams), and may be used to control various aspects of the AM process. The combination of melting pool temperature, thermal gradient, and beam energy flux may be determinant on the quality of a powder bed fusion (PBF) AM process. For example, the amplitude and energy of the acoustic emission waves from the melting pool may depend on the energy beam flux and temperature of the material in latest layer, and a distance between the melting pool and the AE sensors. In addition, the thermal gradient near the melting pool may be relative to temperature of the upper surface and the ambient temperature of the environment where the AM process is taking place. The data fusion process may take all of these factors into account to determine operations to control the AM process, such as whether to slow down the printing rate/speed, adjust one or more temperatures (e.g., cool or heat the ambient environment, increase or lower the temperature of the upper surface of the AM system 101, etc.), modify the energy beam flux, halt/pause the AM process, cancel the AM process, or other operations. Once the operations to control the AM process are determined, whether based on data processing analysis or data fusion analysis, the operations may be provided as commands 112 to the AM system 101 via the printer-controller 119.

The AM system 101 and the control system 102 may be connected via wired or wireless communication links established over one or more networks, which may include Local Area Networks (LANs), the Internet, wireless communication networks (e.g., cellular communication networks, Bluetooth, wireless-fidelity (Wi-Fi) networks, and the like), or other types of communication links that can facilitate the transmission of data 110 and commands 112. The data 110 may include data related to a variety of sensors of the AM system 101, such as sensing units 105, and the control system 102 may store the data 110 at a data center, which may be provided by memory 115 of the control system 102 or a separate data center, such as a data center utilizing memory resources disposed in the cloud (e.g., a cloud-based data center). Likewise, the commands 112 may be transmitted from the control system 102 to the AM system 101 or non-destructive testing (NDT) equipment to control an AM process.

As shown in FIG. 1, the control system 102 may be communicatively coupled to a user device 103, which may be operated by a user or operator. The user device 103 may include one or more processors 107 and a memory 108. The one or more processors 107 may include one or more microcontrollers, ASICs, FPGAs, CPUs having one or more processing cores, or other circuitry and logic configured to facilitate the operations of the monitoring platform 100 in accordance with aspects of the present disclosure. The memory 108 may include RAM devices, ROM devices, EPROM, EEPROM, one or more HDDs, one or more SSDs, flash memory devices, NAS devices, or other memory devices configured to store data in a persistent or non-persistent state. As shown in FIG. 1, the memory 108 may store instructions 109. The instructions 109 may be executable by the one or more processors 107 to perform operations of the user device 103, such as to control and monitor an AM process performed by the control system 102 based on the model 111 received from the user device 103, as described in more detail below. Additionally, the memory 115 may store information, such as the data 110 received from the AM system 101 and the 3D models 111 received from the user device 103 at one or more databases 117.

The user or operator may utilize functionality provided by the user device 103 to design 3D models that may be shared with the control system 102. To illustrate, user device 103 may send 3D models 111 to the control system 102 and the 3D models may be processed by the control system 102 to generate a sequence of commands (e.g., the commands 112) for controlling the 3D printer 104 of the AM system. In addition to providing functionality for generating 3D models, the user device 103 may facilitate monitoring of printing progress by the user. For example, as the data 110 is received from the AM system 101, the control system 102 may generate or update a report 120 of the printing process. The report 120 may be provided to the user device for display, such as via a graphical user interface provided via a stand-alone application or web-based application (e.g., a web browser application or interface). The report 120 may include information related to the data 110 received from the sensing units 105, outcomes of decision-making logic 118, and/or other information (e.g., a status of an AM process, current operating parameters of the 3D printer, and the like). Control system 102 and user device 103 may provide a dynamic interactive platform that enables the user to send new commands to the control system 102 based on information included in the report 120. For example, the report may provide a link to or be presented within a graphical user interface that enables the user to provide commands or other types of feedback to the control system 102 to modify operational parameters of the AM process, stop the AM process, halt the AM process, or other types of information and commands.

Figure 2:
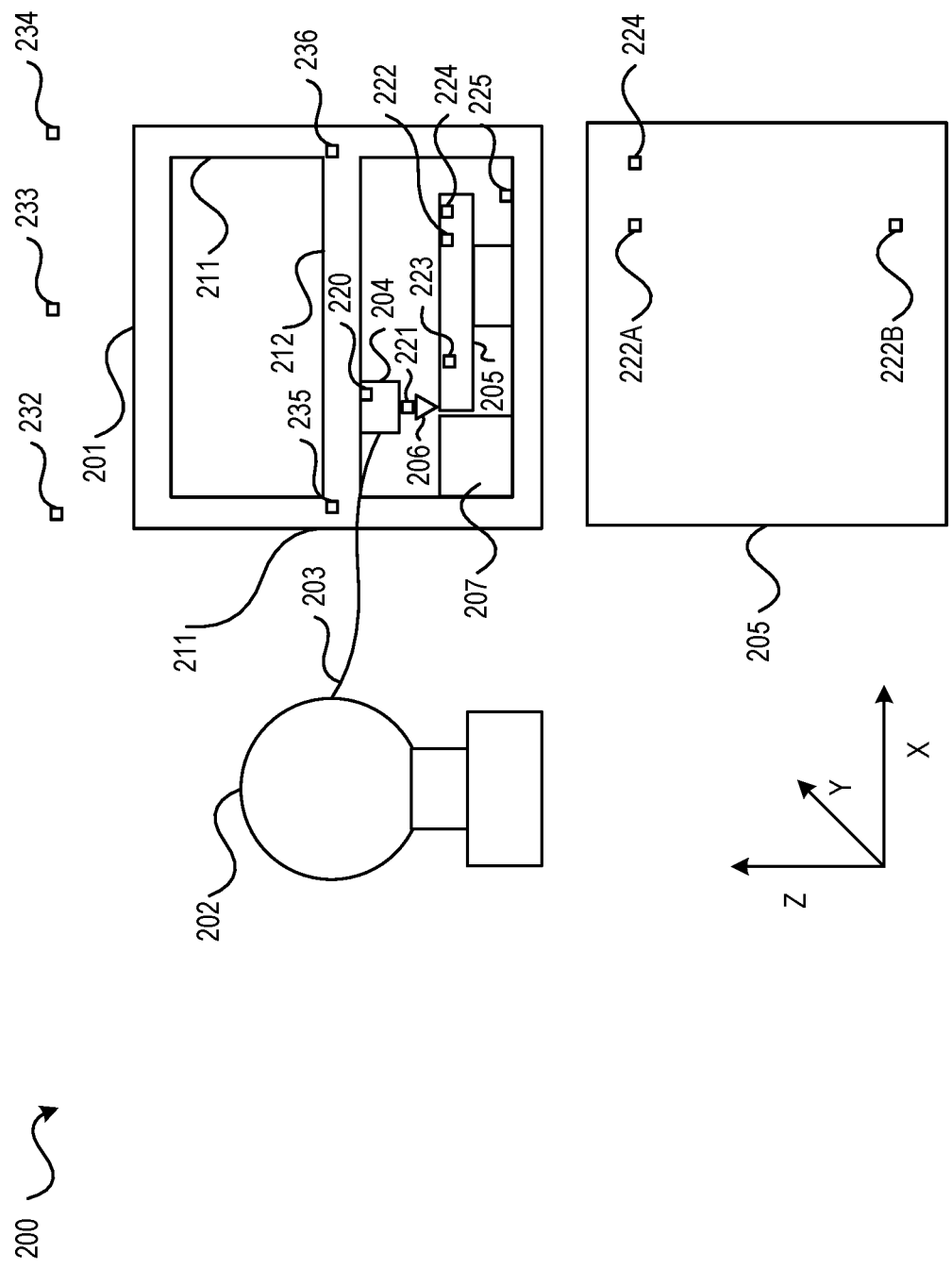
FIG. 2 is a block diagram illustrating concepts for incorporating acoustic sensors into an additive manufacturing system for in situ monitoring of an AM process in accordance with embodiments of the present disclosure.

Referring to FIG. 2, a block diagram illustrating exemplary aspects of an additive manufacturing system configured to provide in situ monitoring functionality in accordance with embodiments of the present application is shown as an AM system 200. In an aspect, the AM system 200 may be the AM system 101 of FIG. 1. As shown in FIG. 2, the additive manufacturing device 200 may include a material dispensing means 204, a printing substrate 205, a support structure or frame 201, and a material source 202. A recoating blade or roller may be present for powder bed fusion additive manufacturing of metals with powder delivery chamber 207. The support structure or frame 201 may include a plurality of vertical support members 211 and one or more horizontal support members 212.

The printing substrate 205 may be configured to support the formation of a structure or object (e.g., the structure or object depicted in the 3D model 111 of FIG. 1) during execution of the additive manufacturing process. Exemplary printing substrates may include printing substrates, platforms, surfaces of components manufactured using AM or other types of processes, or other structures and surfaces upon which an AM process may be performed to deposit material(s). The material dispensing means 204 may be configured to receive a material 203 from the material source 202 and deposit one or more layers of the material 203 onto the printing substrate 205 to form the structure or object. For example, the material dispensing means 204 may include a nozzle or wire feeder configured to deposit layers of the material 203 onto the printing substrate 205 (and previously deposited layers of the material 203). In another approach, the recoater (powder dispenser/blade/roller) 206 may spread a new layer of powder and beam energy may be used to fuse the selected powders to form the 3D part additively. The beam energy may be steered to target the powder(s) deposited on the surface by a beam delivery tool installed on the frame 201 above the printing substrate 205. The plurality of vertical support members 211 and the one or more horizontal support members 212 may include one or more components configured to provide 3D movement of the material dispensing means 204 (or the beam delivery tool) to facilitate construction of a structure or object in 3D space. For example, at least one of the plurality of vertical support members 211 may include one or more belt drives or other components configured to move the material dispensing means 204, and the one or more horizontal support members 212 may include one or more drives or other components configured to move the material dispensing means 204. The material dispensing means 204 may be moved in 3D space using the belt drives or other components of the support structure to deposit layers of the material 203 onto the printing substrate 205 (and previously deposited layers) to form the structure. The movement of the material dispensing means in 3D space may be performed under the control of the control system 102 and the printer-controller 119.

The control system 102 of FIG. 1 may include one or more memories and hard drives and processors to retain and analyze data and commands to different systems. In an aspect, the control system 102 may be deployed, at least in part, on the cloud and the user device 103 works remotely with the AM system 101 and control system 102 via a sophisticated internet platform. As a result, multiple operators can access the system and data may be accessible globally with appropriate permissions. The control system 102 may be configured to perform operations for monitoring and controlling an additive manufacturing process in accordance with embodiments of the present disclosure, as described in more detail below.

Additionally, the control system 102 may store information that may be used to control aspects of an additive manufacturing process. For example, a database (e.g., one of the one or more databases 117) may include one or more 3D-printing files (e.g., mapped 3D information), which may include printing parameters (e.g., material, density, deposition speed, etc.) that may be used to control movement of the material dispensing means 204 in 3D space to deposit layers of the material to facilitate formation of a structure on the printing substrate 205. The control signals may control movement of the material dispensing means 204 in 3D space by controlling the dispensing of the material 203. The control system 102 may also be configured to specify a temperature for heating the material 203 during the additive manufacturing process, such as to achieve a desired flow rate and ensure that the appropriate amount of material is deposited. In general, control system 102 can control the temperature of different parts in the AM system 101, in addition to controlling density of beam energies, such as a laser. Furthermore, control system 102 may have the authority to control the printing parameters, such as density and pitch size, layer thickness, deposition rate, and the like. The controlling information may be specified in the chosen 3D-printing file or may be determined based on the material, geometry, printing strategy, desired mechanical properties, other factors, or a combination thereof.

During the additive manufacturing process, a plurality of sensors may be configured to provide sensor data to the control system 102. The plurality of sensors may include acoustic emission (AE) sensors and the plurality of sensors may be placed at various locations on or proximate to the additive manufacturing device 200. For example, in FIG. 2, the plurality of sensors includes a first AE sensor 220 positioned proximate to or on the material dispensing means 204, two sensors 222A, 222B disposed underneath the surface of the printing substrate 205, and sensor 224 disposed underneath the surface of the base plate 205. The plurality of sensors may include different types of sensors. For example, the sensor 220 may be an acoustic sensor configured to detect acoustic energy in the 100 to 1000 kilohertz (kHz) range, the sensors 222A, 222B may be acoustic sensors configured to detect acoustic waves in the 20 to 400 kHz range, and the sensor 224 may be an acoustic sensor configured to detect acoustic waves in the 5 to 100 kilohertz (kHz) range. It is noted that these frequency ranges have been provided for purposes of illustration, rather than by way of limitation and that acoustic sensors tuned to other frequency ranges may be utilized in accordance with embodiments of the present disclosure. The particular frequencies for each of the plurality of sensors may be designed to detect different aspects of the operations of the additive manufacturing device 200 and/or different types of issues that may arise during performance of the additive manufacturing process. For example, the first sensor 220 may be configured to detect anomalies of defects arising from issues related to the material dispensing means 204, such as improper temperature, flow rate, and the like, which may result in certain defects occurring (e.g., blowouts), while the sensors 222A, 222B, 224 may be configured to detect anomalies or defects that may occur once the material is deposited on the printing substrate 205 (e.g., delamination defects, voids, etc.). The sensors 224 on the printing substrate 205 can be used to detect delamination of the part from printing substrate 205 or crack formations inside the part. Sensors close to deposition or airborne sensors, such as air-coupled transducers, can be incorporated to monitor the acoustics generated from the deposition point, such as a melting pool. A variety of sensing devices may help the acoustic emission signal processing and the following pattern recognition. Thermometers, visual and infrared cameras, humidity sensors, etc. may have important information that can help the pattern recognition and classification of the detected acoustic anomalies.

To elaborate, as the material 203 is received from the material source 202 by the material dispensing means 204, the material 203 may be heated to a target temperature (e.g., based on control information provided by control system 102) and deposited onto the printing substrate 205 (or a previously deposited layer of the material 203). As the additive manufacturing process is performed and sequential layers of the material 203 are deposited, the plurality of sensors may provide sensor data to control system 102. The sensor data may be used by the control system 102 to detect the occurrence of anomalies or defects in the additive manufacturing process. For example, the sensor data may be received by the control system 102 as the data 110 of FIG. 1 and used to determine whether a defect has occurred or predict that a defect may occur in the future. Defect detection processes may be performed by the control system 102 as data (e.g., the data 110 of FIG. 1) is analyzed and classified based on different methods, including: AE classical approaches, machine learning, and artificial intelligence techniques. Some acoustic emission data acquisition methods are hit based (e.g., when a waveform is higher than a threshold), and/or different time interval-period casting strategies. Some of the main signal features defined in AE signal processing are amplitude, number of counts, energy, and various time measurements including duration of waveforms. Additionally, AE signal processing may involve measuring frequency content, entropy, and other signal characteristics. Combinations of waveforms and extracted signal features may be used for pattern recognition and data classification using different methods, such as statistical methods (e.g. K-means algorithms) or machine learning and artificial intelligence algorithms (e.g. supervised or reinforced machine learning).

As used herein, machine learning and artificial intelligence algorithms refer to methods that generate an output with respect to a given set of inputs based on experience and previously generated data. The machine learning processes utilized by embodiments may provide mathematical models/toolboxes having a set of coefficients that may be adjusted to interpolate/curve-fit existing data. The process of calculating/adjusting the coefficients of the mathematical models may involve training the models based on training data, such as data obtained during one or more controlled or test printing processes. The machine learning processes may utilize artificial neural networks, which are networks of connected nodes that transmit the input data throughout the specific functions and coefficients. A chain or series of matrixes and functions, which may be configured with coefficients and weights, transforms the input data to a target output which can be an index to identify the certain patterns or determine decisions based on a set of input data. The coefficients/weights relate to connections and nodes may be calculated/adjusted based on the training data. It is noted that while utilization of neural networks has been described above, such disclosure has been provided for purposes of illustration, rather than by way of limitation and other machine learning methods may be incorporated into the data analysis processes of the present disclosure to perform data processing during monitoring of an AM process.

Furthermore, it is noted that the machine learning and artificial intelligence processes of embodiments may be utilized for both pattern recognition (e.g., using a neural network or other type of machine learning technique), such as to identify features or signatures indicative of defects or normal AM processing and operations, and may also be utilized for decision making, such as to modify or adjust an AM process when an anomaly or defect is detected. During feature or signature identification the machine learning processes may identify patterns within sensor data, which may be AE sensor data only or may be a combination of different types of sensor data, and may utilize a classifier to classify the patterns as being indicative of normal printing operations (i.e., no defect or anomaly detected) or as being indicative of a defect. Patterns that are recognized but that are different from defect-related or normal printing operations may be classified as anomalies. A user may be notified of the anomalies to perform user-aided classification. Additionally or alternatively, one or more of the NDT tools may be utilized to investigate the AM process further to evaluate whether the anomaly is indicative of a defect or normal printing processes. Once the anomaly has been analyzed it may be associated with a defect or normal printing operations and subsequent detection of the pattern associated with the anomaly may result in a classification of the pattern as a defect or normal operations. Classifiers utilized by the machine learning processes of embodiments may include experience-based classifiers, statistical classifiers, both experience-based and statistical classifiers, or other types/combinations of classifiers.

To determine the presence of a defect or predict the occurrence of a defect based on the sensor data 110 received from the plurality of sensors, control system 102 may access information stored at the one or more databases on control system 102. For example, in addition to storing 3D-printing files, the one or more database 117 may include sensor data that may be used to detect or predict the occurrence of defects during a manufacturing process. The database of sensor data may include information associated with various signatures or acoustic signals indicative of different aspects of the additive manufacturing process. For example, the database of sensor data may include acoustic signatures or features indicative of normal operations of the additive manufacturing device 101 or 200, acoustic wave signatures or features indicative of the occurrence of a defect, such as a delamination, a blowout, a void, and the like.

In an aspect, the waveforms and related features stored in the one or more databases 117 of control system 102 may include at least one signature corresponding to a delamination defect, at least one signature corresponding to a void formation, at least one signature corresponding to a blowout, or other signatures associated with other types of defects or potential problems associated with an additive manufacturing process. It is also noted that the acoustic waves and other sensor's information stored in the databases may be specific to the additive manufacturing device 101 and its configuration. Exemplary techniques for creating the acoustic wave signatures or features for use in the monitoring platform 100 are described below. The prescribed methods include AE methods and advanced machine learning techniques and statistical analysis.

In an aspect, the control system 102 may compare the sensor data received from the plurality of sensors to the features or acoustic characteristics indicative of normal additive manufacturing operations to detect the occurrence of a defect or predict that a defect is likely to occur. For example, the data processing logic of the control system 102 may compare the acoustic waveforms stored in the database(s) (e.g., waveforms known to be representative of normal operation of the additive manufacturing device 101) to the sensor data received from the different sensors to determine whether the sensor data deviates from the data indicative of normal operation (a.k.a. anomaly detection). If the sensor data matches the normal signature or acoustic profile to within a threshold tolerance, then the control system 102 may determine that no defect has occurred and the additive manufacturing process may continue. However, if the sensor data does not match parameters indicative of normal conditions to within the threshold tolerance, then the control system 102 may determine that a defect has occurred and the decision-making logic 118 may execute one or more operations. The one or more operations performed upon detecting a defect may include reporting the occurrence of the defect to the user device 103 and/or providing commands to AM system 101 (e.g., stop/halt print commands, modifications to print parameters, and the like) via printer-controller 119. Statistical and machine learning methods can be used for data analysis to determine the different characteristics of normal and abnormal acoustic signals with combination to other data or different sensors, including cameras and thermometers. Statistical parameters and machine learning tools may be designed to detect specific patterns corresponding to defects or malfunctioning of the AM system 101. As an alternative approach, a data analysis toolbox may be provided that detects when any sensor data does not look like sensor data output during normal operations, which enables the control system 102 to spot anomalies, and detected anomalies may be marked as different flaws or defects by classification and clustering data analysis. One of the outputs of the decision-making logic 118 may be a classified dataset where data is marked with different pre-known phenomena, conditions, or marked as an unknown cluster. After analyzing the data, decision-making unit 118 can determine a proper response (e.g., change a temperature of the AM process, a material deposition rate, halt/pause the AM process, cancel the AM process, etc.), which may be applied to the AM system 101 via the printer-controller 119. At some points, user device 103 may be asked to assist the control system 102 to mark the best class for a detected anomaly. The decision-making logic 118 may collect features (e.g., sensor data 110) from the various sensing units 105 (e.g., AE sensors, cameras, thermometers, etc.) and after analyzing the data, may produce an indication/statement that may be used to decide on possible commands or operations for controlling the AM process being performed by the AM system 101.

The decision-making center determines whether operator's intervention is needed, or specific direct commands may be sent to the AM system 101 autonomously. A decision regarding the next steps for the AM process (e.g., continue the AM process, modify the AM process, cancel the AM process, halt the AM process, etc.) may be made upon the combination of output of the decision-making logic 118, the type of material being used in the AM process, a minimum sensitivity, and the analysis of the data 110. The one or more control operations may include halting the additive manufacturing process or modifying one or more parameters of the additive manufacturing process, such as to modify a flow rate of the material 203 being deposited by the material dispensing means 204, a temperature to which the material 203 is heated, a temperature parameter associated with the material dispensing means, a printing substrate temperature parameter, a density of an energy beam (e.g., laser beam used for a powder-based AM process), a fill density parameter, a rate of travel used to move the material dispensing means 204 across the printing substrate 205, or other parameters.

Acoustic signatures may be correlated to specific events that happen during the printing. For example, if the deposition speed is extremely high, an acoustic signal with specific features correlated to the high speed may be generated. Thus, the decision-making logic 118 may conclude that the printer 104 is printing at high speed and request the printer-controller 119 to modify the printing parameters used by the AM system 101, such as to transmit commands 112 to the AM system 101 to reduce the printing speed. Another event may be detection of excessive density for an energy beam causing a burst and/or splash of the melted material, which may generate unique acoustic signals. The characteristics of these acoustic signals may be monitored to detect high energy density which may then be used to generate (e.g., by the printer-controller 119) commands 112 to correct the energy density used for the AM process. Control system 102 may also control the different NDT units of AM system 101 in order to inspect the part in situ. As an example, control system 102 can run ultrasonic (e.g., laser-ultrasonic) inspection equipment to look for voids or defects close to the surface at certain points due to the information detected by decision-making logic 118.

As an illustrative example, the additive manufacturing process may produce transient elastic signals that may be defined as acoustic emissions and the energy and frequency characteristic of such signals may change as the process deviates from the optimal expected behavior. The sensors and control system 102 may characterize the acoustic signals captured during the additive manufacturing process and identify when data (e.g., the data 110) received from the sensors deviates from the expected behavior. In addition, analysis of the signals that deviate from the expected response may be correlated to specific types of damage formation. For example, defective powder fusion or formation of defects in the structure being manufactured (e.g., due to thermal stresses) may produce acoustic emission signals that deviate from an expected response. The presence of signals associated with damage of the part may indicate a particular type of defect, such as: fracture, cracking and delamination in the part and from the printing substrate 205; poor welding (e.g. due to lack of fusion); formation of air pockets in the solidified material (e.g., gas pores/keyholes); or other defects. Often these defects are formed during the cooling and solidification process, which occurs after the laser beam or electron beam has been fired to the powders (e.g., the material in powder delivery chamber 207). The formation of defects releases an elastic wave which may be detected by the control system 102 via the process described above based on baseline information (e.g., signatures or profiles of acoustic emissions or energy associated with normal or non-defective additive manufacturing operations).

In an alternative or additional aspect, the decision-making logic of the control system 102 may be configured to compare the sensor data 110 received from the plurality of sensor units 105 to the signature(s) or acoustic profile(s) indicative of a defect in the additive manufacturing operations to determine that a defect has occurred or predict that a defect is likely to occur. For example, control system 102 may compare the acoustic waves and extracted features stored in the databases 117 associated with the occurrence of defects in the AM system 101 to the sensor data 110 received from the plurality of sensors to determine whether the sensor data matches the signature(s) or acoustic profile(s) indicative of the presence of a defect. Statistical and machine learning methods may be implemented for signal/data processing to extract particular features/indexes or classify the aggregated data based on various defined events. Some straightforward indexes that can be extracted from acoustic emission signals are amplitude, rise time, energy, number of counts, duration, entropy, frequency content, and also output of a mathematical expression. The extracted indexes and features can be directly correlated to patterns and events or used as the input of statistical/machine learning processes to identify or detect the occurrence of a defect. If the sensor data matches a defined signature or class to within a threshold tolerance then the decision-making logic 118 may determine that a defect has occurred and execute a series of operations and report to the operator. The one or more operations performed by the decision-making logic 118 in response to detecting a defect may include notifying the printer-controller 119, which may generate and transmit commands 112 to the AM system 101 to control the AM process. The commands 112 may include commands to halt the additive manufacturing process, modify one or more parameters of the AM process, or run an additional NDT tool 106 for further inspection, as described above. However, if the sensor data does not match the features or defined classes then the control system 102 may determine that a defect has not occurred or is not about to occur and the additive manufacturing process may continue. It is noted that the pattern matching techniques described above have been provided for purposes of illustration, rather than by way of limitation and that other pattern matching techniques may be utilized in accordance with embodiments, such as pattern matching techniques utilizing machine learning and the like.

To illustrate data fusion and its unique application to the concepts described herein, a data fusion process may be fed data 110 from the sensing units 105 of the AM system 101, such as data from an infrared camera, thermometer sensors on air, the printing rate/speed, and a plurality of AE sensors for monitoring and controlling energy density of energy beams (e.g., laser beams) used by an AM process. The combination of melting pool temperature, thermal gradient, and beam energy flux may be very determinant on the quality of a powder bed fusion (PBF) AM process. For example, the amplitude and energy of the acoustic emission waves from the melting pool may depend on the energy beam flux and temperature of the material in latest layer, and a distance between the melting pool and the AE sensors. In addition, the thermal gradient near the melting pool may be relative to temperature of the upper surface and the ambient temperature. Therefore, a statistical/machine-learning model can be implemented to assess if the energy beam flux is in a normal range or exceeds limitations. If the range is exceeded, a series of commands 112 can be initiated by the printer-controller 119 at the request of the decision-making logic 118, where the series of commands may include corrective commands to adjust the energy beam flux. In another exemplary scenario for extrusion-based AM processes, the temperature of the nozzle, the input energy of the heater on the extruder, a material flow rate, a printing rate, and sensor data received from an infrared camera data can be fused and analyzed together to assess if the heater is working in the correct range and the temperature on the melting zone and the area around is controlled properly. Acoustic emission data can be monitored in case the deviation from normal thermal conditions causes thermo-mechanical stresses which can release acoustic emission signals.

Adjusting the additive manufacturing process may include stopping/pausing or cancelling the additive manufacturing process completely. For example, if a delamination is detected, such a defect may cause the part to fail or be unfit for use (e.g., in the automotive or aerospace industries). For complex parts manufactured using additive manufacturing techniques and processes, stopping the process upon the occurrence of a defect that critically impacts the part may significantly improve the manufacturing process. To illustrate, if a complex part takes 1 week to manufacture via an additive manufacturing process and a defect is detected early on, the remaining days of the manufacturing process may be saved by stopping the process immediately and starting the process for a new part. For other types of parts where some defects may be tolerable, the process may continue until a certain number of defects have occurred. For example, when accumulated defects exceed a threshold number of defects, the process may be stopped (e.g. because the accumulation of defects is no longer tolerable). If the threshold number of defects is not reached, the process may proceed to completion. It is noted that when the AM process is stopped or paused, the NDT tools 106, such as laser ultrasonic testing, may be initiated to start a thorough inspection of the latest layers to look for possible flaws which could be associated with the received acoustic emissions. This can lead to evaluating the severity of the occurred flaws and providing valuable data for the machine learning data clustering toolbox.

As another example, adjusting the additive manufacturing process may include adjusting one or more operating parameters of the additive manufacturing device 200 or the additive manufacturing process. For example, the control system 102 may be configured to adjust a temperature to which the material 203 is heated, a flow rate at which the material 203 is dispensed, a speed at which the material dispensing means 204 or melt pool travels, a rate at which the material 203 is provided to the material dispensing means 204 from the material source, or other operational parameters of the additive manufacturing device 201 or additive manufacturing process. Adjusting the operational parameters may improve the efficiency of the additive manufacturing device 101 and the additive manufacturing process by controlling factors that may decrease or prevent potential faults from occurring (e.g., based on predicted faults determined by the one or more processors as described above). Where operating parameters of the AM system 101 are made to improve the AM process and prevent the occurrence (or recurrence) of a defect, the control system 102 may update the 3D-printing file (i.e., mapped 3D information of printing parameters like material, density, deposition speed, etc.) to include those adjustments. By updating the 3D-printing file (e.g., the model(s) 111) to incorporate changes designed to mitigate the occurrence of defects, future use of the 3D-printing file in an AM process may result in a reduced likelihood that defects occur.

The AM system 200 may additionally include a second plurality of sensors marked as 232, 233, 234, 235, 236, 223, 225 in FIG. 2, which may be installed on the frames or outside of the printer. During operation of the AM system 200, the plurality of sensors described above and the second plurality of sensors (e.g., the sensors 232, 233, 234, 235, 236, 223, 225) may be utilized to capture acoustic energy information during operation of the AM system 200, which is similar to AM system 101. The secondary plurality of sensors may be used to detect vibrations and noises coming from the room in which the AM system 200 (or 101) is situated and other outside or external sources, which may assist the exclusion of false indications or the like. It is noted that the particular number and location of the sensors shown in FIG. 2 with respect to the second plurality of sensors has been provided for purposes of illustration and that other sensor positions and quantities may be utilized depending on the particular additive manufacturing device for which the signatures or profiles are being generated.

The printing strategies, e.g., deposition orientation, can determine the mechanical properties of the material as well as the probability of certain defects occurrence. Therefore, the sensors' data interpretation may require information regarding 3D coordinates of deposition points, which may be included as part of the printing parameters included in the 3D model 111. For example, the 3D model 111 may include geometry data and the geometry data may be used to synchronize received sensor data (e.g., data 110 of FIG. 1) with time and geometry to more accurately perform data fusion and interpretation of sensor data during monitoring of the AM process.

Figure 3:
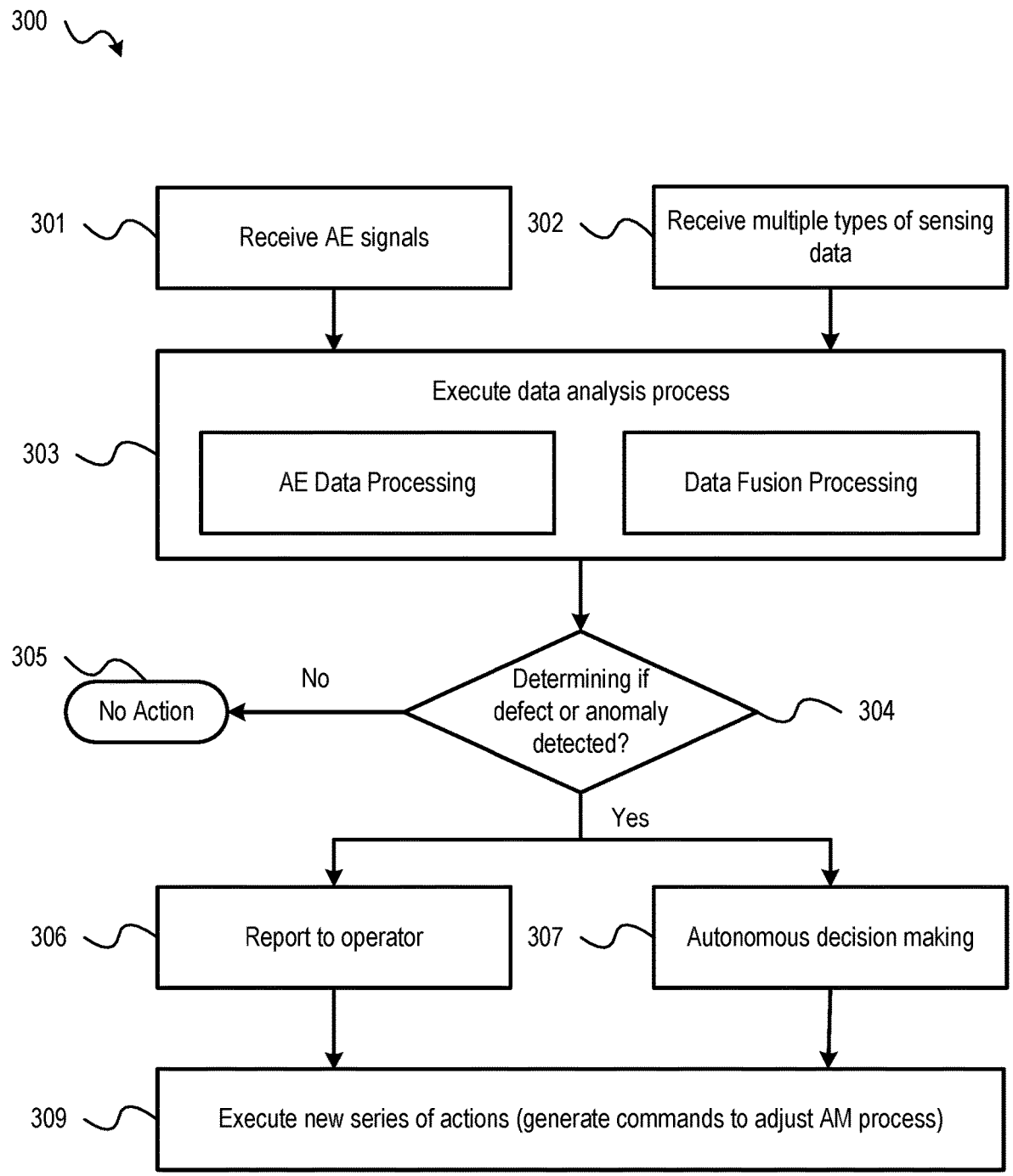
FIG. 3 is a flow diagram illustrating an exemplary method for performing in situ monitoring of an additive manufacturing process in accordance with embodiments of the present disclosure.

Referring to FIG. 3, a flow diagram illustrating an exemplary method for performing online monitoring of an additive manufacturing process in accordance with embodiments of the present disclosure is shown as a method 300. In an aspect, the method 300 may be performed by an additive manufacturing control system, such as the control system 102 of FIG. 1. Operations of the method 300 may be stored as instructions (e.g., the instructions 116 of FIG. 1) that, when executed by one or more processors (e.g., the processors 114 of FIG. 1), cause the control system to perform the steps of the method 300. The instructions and commands may be stored locally or on the internet (Cloud) for remote manufacturing and monitoring. It is worth mentioning that the method 300 may be the combination of different gated algorithms that manage equipment, data, decisions, and commands of an AM monitoring platform, such as the monitoring platform 100 of FIG. 1.

As shown in FIG. 3, the method 300 may include receiving, at step 301, AE signal data from one or more AE sensors and receiving, at step 302, multiple types of sensing data from one or more other sensors, which may include multiple types of sensing data (e.g., infrared camera data, temperature data, etc.) or may include multiple samples of a single type of non-AE sensor data (e.g., temperature data from multiple temperature sensors). At step 303, the method 300 includes executing a data analysis process on at least a portion of the AE signals and the sensing data. In an aspect, the data analysis process may be performed by decision-making logic (e.g., decision-making logic 118 of FIG. 1) of a control system (e.g., the control system 102 of FIG. 1). As described above with reference to FIGS. 1 and 2, the data analysis process may be a simple data processing operation where data of a single type is analyzed, such as analyzing AE signal data, or may include more complex data analysis processes, such as a data fusion process configured to analyze multiple different types of sensor data that has been synchronized. During the data fusion and analysis process, the AE signal data from the plurality of AE sensors may be analyzed in conjunction with variety of other sensing data (e.g., heterogenous sensing data), such as infrared and/or visual cameras, thermometers, humidity sensors, and photodiodes, to determine whether a defect or anomaly occurred during an additive manufacturing process.

At step 304, the method 300 includes determining whether any anomalies or defects have occurred during the AM process. As described above, determining whether anomalies or defects are present may include identifying features based on the analysis of the AE signals and the sensing data to determine and classify those features as indicating the presence of a defect or anomaly. If no anomalies or defects are detected, the method 300 may proceed to block 305, where no remedial action is taken. Instead, the method 300 may continue to monitor and receive AE signals and sensor data as the AM process continues. If, however, an anomaly or defect is detected, a set of actions may be determined. During the data analysis and anomaly/defect detection processing, the sensor data (e.g., the AE signals and the sensing data) may be synchronized with geometry information and printing attributes; a probability of defect or anomaly formation may be calculated, and the detected anomaly/defect may be compared to one or more defined thresholds.

If any odd activity or defect is detected, the method 300 may transmit data (e.g., the report(s) 120 of FIG. 1) regarding the detected anomaly or defect to an operator device, at step 306, and/or may perform autonomous decision-making, at step 307. During the decision-making stage (e.g., steps 306 and/or 307) a series of actions may be determined or a user (e.g., a user operating the operator device) may be prompted to input commands to control the AM process. Where autonomous decision-making is performed (e.g., at step 308), a printer-controller (e.g., printer-controller 119 of FIG. 1) may determine one or more commands (e.g., commands 112 of FIG. 1) and provide the command(s) to the AM system to control the AM process. As described above with reference to FIGS. 1 and 2, the control operations may include cancelling or stopping the AM process, adjusting one or more operating parameters of the AM system, or halting the additive manufacturing process (and resuming at a later time). The commands may also include commands to one or more NDT tools (e.g., the NDT 106 of FIG. 1), such as a laser-ultrasonic or laser profilometer, of the AM system (e.g., the AM system 101 of FIG. 1) to inspect the part being built and search for or confirm the presence of any defect (e.g., a delamination, a void, and the like).

During the decision-making stage 306, details/notifications regarding detection of anomalies and defects, when detected at step 303, may be reported to the operator(s) and the user may be prompted to confirm or approve actions based on different possible scenarios. This is aside from autonomous decision-making process (e.g. step 307) that can directly stop/halt/pause the printing process, modify the printing parameters, or run an NDT inspection. The user(s)/operator(s) may also receive notifications containing a list of automatic actions made by an autonomous decision-making algorithm in step 307, and in some aspects, the user may be provided with the option to change the operations or actions determined by step 307. In an aspect, the notification may prompt a response from the user to confirm or approve the change and the control system (e.g., the control system 102 of FIG. 1) may not execute the changes or modifications until after the user confirms or approves the changes. In some instances, the method 300 may detect an odd activity/anomaly, like an acoustic emission burst, but may be unable to classify it within the current available denoted features and signatures. In such a scenario, the data processing stage 303 may present data regarding the detected conditions to the user and prompt a manual data classification of the unknown incident. Data processing parameters may be adjusted based on the manual data classification by the user to enhance the accuracy of the flaw detection and pattern recognition processes. Once the adjusted or modified AM process parameters are determined, the method 300 may include, at step 308, executing a new series of actions. The new series of actions may include actions that incorporate the modified parameters and adjustments made during steps 306/307 of the method 300.

Figure 4:
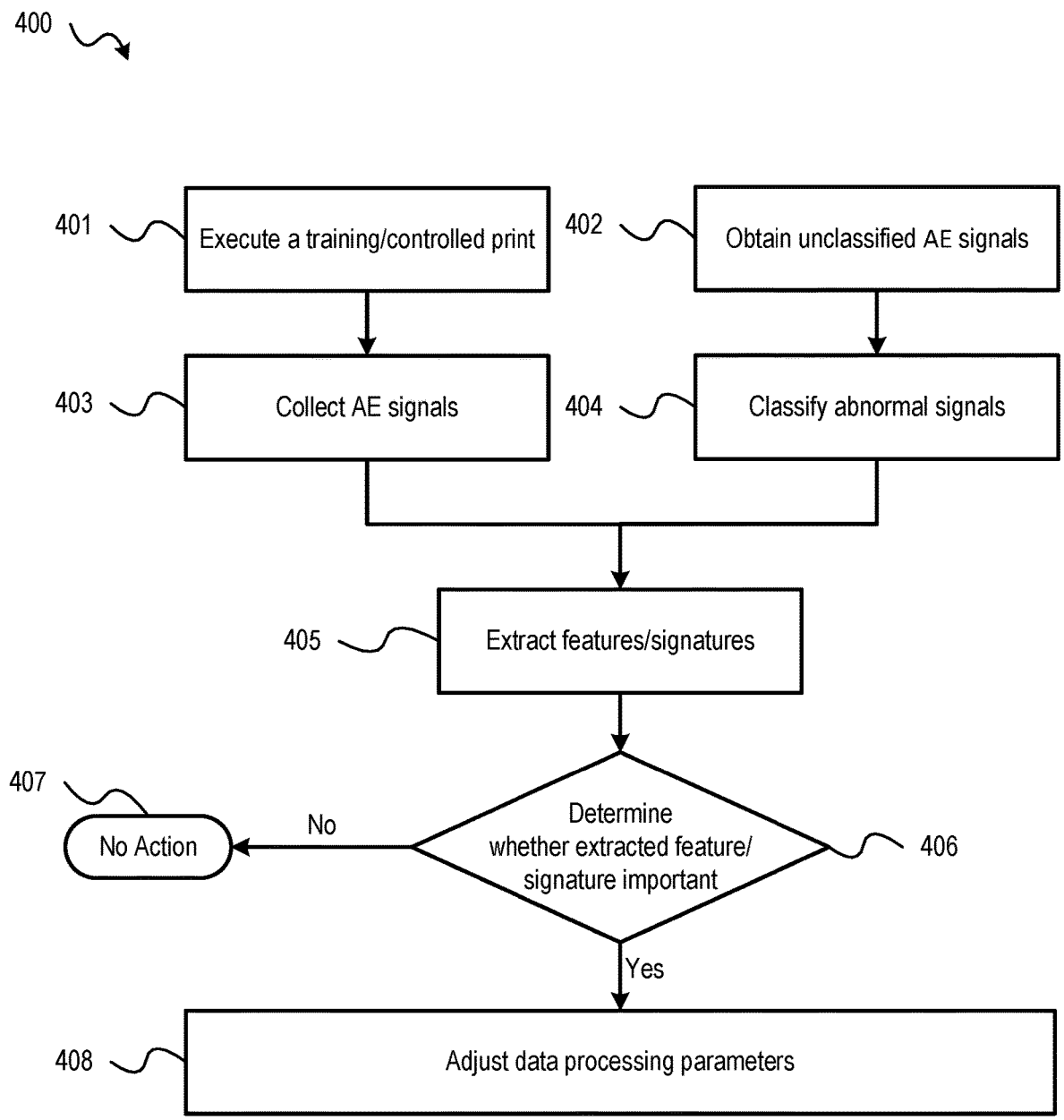
FIG. 4 is a flow diagram of a method for creating and training the data analysis units based on collected data from actual or mock printing processes in accordance with embodiments of the present disclosure.

As described above, the data processing and decision-making algorithms of the present disclosure may need exposure to experimental data in order to accurately classify or detect anomalies or defects. Such experimental data may be used to find formulas and/or coefficients, such as neural network weights, that may subsequently be used to perform anomaly/defect detection. Since majority of parameters in signal processing and data analysis algorithms may require adjustments based on real experimental data, a large quantity of data collected from sensors for different scenarios and printing parameters may need to be generated. An exemplary method for generating experimental data that may be used to build a library of sample data for anomaly/defect detection according to aspects of the present disclosure is shown in FIG. 4, where input data, proposed training algorithms, and desired outputs are presented. It should be noted that the method illustrated in FIG. 4 is extendable to rather sophisticated methods like more precise design of experiments to optimize the data processing parameters in which the system is more generalized and stable with minimum errors and outliers.

As shown in FIG. 4, the method 400 may include, at step 401, executing a training or controlled printing process. At step 403, information associated with acoustic waves and other types of sensor data (e.g., infrared sensor data, temperature data, etc.) generated during the training or controlled printing process may be captured and used to generate signatures or features associated with various aspects of an AM process. For example, at step 405, the method 400 includes extracting features/signatures from the captured acoustic waves. During step 405, the signatures or features that may be used to identify anomalies or defects occurring during an AM process may be created and stored. Exemplary AE features may include amplitude, number of counts, energy, and various time measurements including duration of waveforms. Additionally, features detected from AE signal processing may involve measuring frequency content, entropy, and other signal characteristics. Combinations of waveforms and extracted signal features may be used for pattern recognition and data classification using different methods, such as statistical methods (e.g., K-means algorithms) or machine learning and artificial intelligence algorithms (e.g., supervised or reinforced machine learning). Capturing the AE signals under controlled situations via a training/controlled print designed to induce certain outcomes, such as the occurrence of a specific defect (e.g., a delamination, a void, a blowout, and the like) or to produce a correct or normal outcome (e.g., no defect occurs) may enable accurate features/signatures to be obtained. For example, during a particular phase of the controlled print, acoustic signals may be generated and features related to a particular frequency, energy, number of counts, etc. may be generated. If a defect occurs as these features are captured, those features may be used to classify the identified features as indicative of a defect. Machine learning models and processes may be trained using the features extracted during the controlled print and used to analyze production or non-test runs of AM processes. The features corresponding to the defect may be saved as a signature that may be used to detect defects during production of structures via AM manufacturing processes. In a different approach, features of a normal printing process can be collected, so then anomalies may be captured among the received data to spot irregular activities during other printing process.

It is noted that the collection of signals, at step 403, may include signals or sensor data in addition to acoustic or AE signals. For example, sensing data from multiple types of sensors, such as cameras, thermometers, etc. may also be obtained, synchronized, and combined with the AE signals similar to the data fusion processes described herein to extract features/signatures. For example, as the additive manufacturing process takes place under a particular scenario, each of the acoustic sensors may capture acoustic emission signals and synchronized with signals received from other sensors (e.g. temperatures measurements or infrared images). Samples of acoustic waves or other sensor data may be timestamped and associated with various aspects of the AM process to facilitate synchronization. For example, timestamped acoustic wave samples may be associated with information that indicates whether the material dispensing means 204 is operating properly at a certain rate; if the powder dispenser 206 performs correctly (monitored by sensor 221); temperature information (e.g., a temperature at which the material is heated prior to being dispensed by the material dispensing means, a printing substrate temperature, an ambient temperature of the environment where the additive manufacturing device is being operated, etc.) may be collected, infrared image data may be captured; or other aspects of the additive manufacturing process may be monitored and readings may be timestamped. The timestamped information may additionally or alternatively be associated with various defects or normal operations (e.g., no defects). For example, the additive manufacturing process may be controlled to induce a particular defect and the timestamped information may be associated with that particular defect. Additionally or alternatively, sensor data for a normal printing processes may be collected and anomalies may be detected as deviations from the normal data. In an aspect, both normal sensor data and anomaly sensor data may be used (e.g., features/signatures used to detect defects, may include features/signatures of normal operations and defects may be detected as deviations from normal signatures, and features/signatures of defects may be captured and used to confirm or detect the occurrence of a defect).

As described above with reference to FIG. 4, the signature or profile information captured during the controlled simulation runs of the AM process may be compared to real-time sensor data captured during a production run of the AM process to detect and/or predict the occurrence of a defect (e.g., a void, a delamination, a blowout, etc.). Because different AM devices provided by one or more manufacturers may produce different acoustic signatures or sensor data for the same additive manufacturing process, the signatures or profiles may be specific to a particular model of an AM device, system, or setup (e.g., a layout or configuration of the AM system). Thus, when configuring a real-time AM monitoring platform, such as the monitoring platform 100 of FIG. 1, to perform online monitoring for defects during additive manufacturing process operations, a control system (e.g., the control system 102 of FIG. 1) may be programmed with signatures corresponding to the correct additive manufacturing device configuration (e.g., features/signatures designed for the AM device being monitored and the environment where the AM system is operating). In this manner, nuances particular to each different AM device and/or AM process may be accounted for through custom signatures or features.

At step 406, the method 400 includes determining whether extracted features or signatures are important. For example, during data processing and feature extraction, different data processing and pattern recognition methods may be considered, such as mathematical models, statistical models, and machine learning toolboxes. The important features and signatures must be configured and selected based on the sensitivity of the feature/signature to a certain event or incident (i.e., does the presence of a particular signature signify the occurrence of a defect or anomaly or not). Upon determining the desired features, coefficients and optimized weights can be calculated by exposing and training the models to generate data of multiple experiments (e.g., multiple controlled prints under the same operating parameters and conditions). As signatures and features of importance are identified, the method 400 may include updating data processing parameters, at step 408. This may include updating the designed toolboxes and related coefficients used to monitor AM processes (e.g., for deployment in non-test run scenarios). Where no important features/signatures are detected, the AM process may proceed to block 407 and the training may continue (e.g., if the training AM process is not complete) or may end.

It is noted that during a printing processes new types of data may be generated and unclassified anomalies may be detected. For example, as shown in FIG. 4, the method 400 may include, at step 402, obtaining unclassified AE signals. The unclassified AE signals may correspond to AE signals or other sensor data detected during an AM process that cannot be matched to existing signatures or features. This may occur during a training process or during a production run of the AM process. At step 404, the method 400 includes classifying the abnormal signals (e.g. the unclassified AE signals). It is noted that a manual classification process may be initiated to classify the abnormal signals, which may be beneficial as the abnormal signals may be presumed to have been missed or not detected during the training process. Once classified, the features/signatures may be processed according to steps 405 and 406.

It is noted that various aspects of the above-described AM systems and monitoring platforms may be configured to enable multiple users to access, control, and monitor AM devices (e.g., printers, etc.) and processes remotely. For example, in a cloud-based or server-based configuration, one or more users may be provided with access to information generated by the Am monitoring platform, such as information associated with generated reports, 3D models stored by the platform, historical sensor data, real-time sensor data, printing process status, feature and signature data, or other information. The users may be provided with concurrent access such that all users may simultaneously access the data or sequential access (e.g., one users may access a piece of information at a time). It is noted that where concurrent access is provided, one or more mechanisms to ensure that data is not modified by two users but only one of the user's changes is stored may be provided, such as to facilitate version control and maintain data consistency and accuracy on the system. The remote access may enable users to monitor AM processes from different geographic locations, review and edit data generated during the AM processes, and other functionality.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. It is noted that the disclosed embodiments for performing online monitoring of AM processes, while described with respect to certain AM methods, may be readily applied to other AM techniques not expressly described herein, such as directed energy deposition, photopolymerization, material jetting, sheet lamination, additive friction stir deposition, hybrid manufacturing, and the like. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A method for detecting defects during an additive manufacturing process, the method comprising:
transmitting, by one or more processors of a control system, one or more commands to control creation of a structure by an additive manufacturing device;
capturing, by a plurality of sensors disposed proximate to one or more components of the additive manufacturing device, information associated with acoustic waves generated during one or more controlled operations of the additive manufacturing device;
generating, by the one or more processors, a plurality of signatures based on the information captured by the plurality of sensors, wherein each signature of the plurality of signatures corresponds to a defect or an anomaly that is likely to occur during an additive manufacturing process to be performed by the additive manufacturing device;
receiving, by the one or more processors, sensor data from the plurality of sensors as the additive manufacturing process is performed by the additive manufacturing device, the sensor data including acoustic signal data received from acoustic sensors of the plurality of sensors and non-acoustic sensor data received from non-acoustic sensors of the plurality of sensors;
synchronizing, by the one or more processors, the acoustic signal data with the non-acoustic sensor data to produce synchronized sensor data;
comparing, by the one or more processors, the synchronized sensor data with the plurality of signatures to detect patterns within the synchronized sensor data that are indicative of corresponding defects or anomalies during the additive manufacturing process; and
transmitting, by the one or more processors to the additive manufacturing device, one or more new commands to adjust one or more operational parameters of the additive manufacturing process, based on the detected patterns.

2. The method of claim 1, wherein the one or more commands comprises at least one command selected from the list consisting of: movement of a material deposition means configured to deposit material during the additive manufacturing process, deposition of a material, and dispensing the material to the material deposition means.

3. The method of claim 1, wherein generating the plurality of signatures comprises:
extracting one or more features from the captured information;
determining whether the one or more extracted features indicate the presence of one or more defects or anomalies; and
generating one or more signatures of the plurality of signatures based on the one or more extracted features determined to indicate the presence of the one or more corresponding defects or anomalies.

4. The method of claim 3, wherein determining whether the one or more extracted features indicate the presence of the one or more defects or anomalies includes executing a machine learning process on the extracted one or more features, the machine learning process configured to classify each of the features as a feature indicative of a defect, a feature indicative of an anomaly, or a feature indicative of a normal operation during the additive manufacturing process.

5. The method of claim 4, wherein the machine learning process is configured to:
identify the patterns present in at least one of the acoustic signal data or a combination of the acoustic signal data and the non-acoustic sensor data; and
classify the patterns as indicative of a defect or an anomaly corresponding to at least one signature of the plurality of signatures.

6. The method of claim 5, wherein the machine learning process is configured to determine one or more modifications to the additive manufacturing process based on the defect or the anomaly indicated by the patterns.

7. The method of claim 6, wherein the patterns are identified and the one or more modifications are determined using a neural network.

8. The method of claim 5, wherein the machine learning process comprises an experience-based classifier, a statistical classifier, or both.

9. The method of claim 5, further comprising determining adjustments to the one or more operational parameters of the additive manufacturing process to reduce a likelihood of the defect or the anomaly occurring during the additive manufacturing process.

10. A non-transitory computer-readable storage medium storing instructions that, when executed by one or more processors, cause the one or more processors to perform operations for detecting defects during an additive manufacturing process, the operations comprising:
transmitting one or more commands to control creation of a structure by an additive manufacturing device;
capturing information associated with acoustic waves using a plurality of sensors disposed proximate to one or more components of the additive manufacturing device, wherein the information is generated during one or more controlled operations of the additive manufacturing device;
generating a plurality of signatures based on the information captured by the plurality of sensors, wherein each signature of the plurality of signatures corresponds to a defect or an anomaly that is likely to occur during an additive manufacturing process to be performed by the additive manufacturing device;
receiving sensor data from the plurality of sensors as the additive manufacturing process is performed by the additive manufacturing device, the sensor data including acoustic signal data received from acoustic sensors of the plurality of sensors and non-acoustic sensor data received from non-acoustic sensors of the plurality of sensors;
synchronizing the acoustic signal data with the non-acoustic sensor data to produce synchronized sensor data;
comparing the synchronized sensor data with the plurality of signatures to detect patterns within the synchronized sensor data that are indicative of corresponding defects or anomalies during the additive manufacturing process; and
transmitting, to the additive manufacturing device, one or more new commands to adjust one or more operational parameters of the additive manufacturing process, based on the detected patterns.

11. The non-transitory computer-readable storage medium of claim 10, wherein the one or more commands comprises at least one command selected from the list consisting of: movement of a material deposition means configured to deposit material during the additive manufacturing process, deposition of a material, and dispensing the material to the material deposition means.

12. The non-transitory computer-readable storage medium of claim 10, wherein generating the plurality of signatures comprises:
   extracting one or more features from the captured information;
   determining whether the one or more extracted features indicate the presence of one or more defects or anomalies; and
   generating one or more signatures of the plurality of signatures based on the one or more extracted features determined to indicate the presence of the one or more corresponding defects or anomalies.

13. The non-transitory computer-readable storage medium of claim 12, wherein determining whether the one or more extracted features indicate the presence of the one or more defects or anomalies includes executing a machine learning process on the extracted one or more features, the machine learning process configured to classify each of the features as a feature indicative of a defect, a feature indicative of an anomaly, or a feature indicative of a normal operation during the additive manufacturing process.

14. The non-transitory computer-readable storage medium of claim 13, wherein the machine learning process is configured to:
   identify the patterns present in at least one of the acoustic signal data or a combination of the acoustic signal data and the non-acoustic sensor data; and
   classify the patterns as indicative of a defect or an anomaly corresponding to at least one signature of the plurality of signatures.

15. The non-transitory computer-readable storage medium of claim 14, wherein the machine learning process is configured to determine one or more modifications to the additive manufacturing process based on the defect or the anomaly indicated by the patterns.

16. The non-transitory computer-readable storage medium of claim 15, wherein the patterns are identified and the one or more modifications are determined using a neural network.

17. The non-transitory computer-readable storage medium of claim 14, wherein the machine learning process comprises an experience-based classifier, a statistical classifier, or both.

18. The non-transitory computer-readable storage medium of claim 14, wherein the operations further comprise determining adjustments to the one or more operational parameters of the additive manufacturing process to reduce a likelihood of the defect or the anomaly occurring during the additive manufacturing process.

19. A system for detecting defects during an additive manufacturing process, the system comprising:
   a plurality of sensors disposed proximate to one or more components of an additive manufacturing device;
   one or more processors communicatively coupled to the plurality of sensors; and
   a memory coupled to the one or more processors, the memory storing instructions, which, when executed by the one or more processors, cause the one or more processors to perform a plurality of operations, including operations to:
   transmit one or more commands to control creation of a structure by the additive manufacturing device;
   capture information associated with acoustic waves using at least one sensor of the plurality of sensors, wherein the information is generated during one or more controlled operations of the additive manufacturing device;
   generate a plurality of signatures based on the information captured by the plurality of sensors, wherein each signature of the plurality of signatures corresponds to a defect or an anomaly that is likely to occur during an additive manufacturing process to be performed by the additive manufacturing device;
   receive sensor data from the plurality of sensors as the additive manufacturing process is performed by the additive manufacturing device, the sensor data including acoustic signal data received from acoustic sensors of the plurality of sensors and non-acoustic sensor data received from non-acoustic sensors of the plurality of sensors;
   synchronize the acoustic signal data with the non-acoustic sensor data to produce synchronized sensor data;
   compare the synchronized sensor data with the plurality of signatures to detect patterns within the synchronized sensor data that are indicative of corresponding defects or anomalies during the additive manufacturing process; and
   transmit, to the additive manufacturing device, one or more new commands to adjust one or more operational parameters of the additive manufacturing process, based on the detected patterns.

20. The system of claim 19, wherein the one or more commands comprises at least one command selected from the list consisting of: movement of a material deposition means configured to deposit material during the additive manufacturing process, deposition of a material, and dispensing the material to the material deposition means, and wherein the operations performed by the one or more processors include operations to:
   extract one or more features from the captured information;
   determine whether the one or more extracted features indicate the presence of one or more defects or anomalies; and
   generate one or more signatures of the plurality of signatures based on the one or more extracted features determined to indicate the presence of the one or more corresponding defects or anomalies.

* * * * *